June 4, 1940.   R. S. PEIRCE   2,203,178
ANCHORING DEVICE
Original Filed Feb. 20, 1930
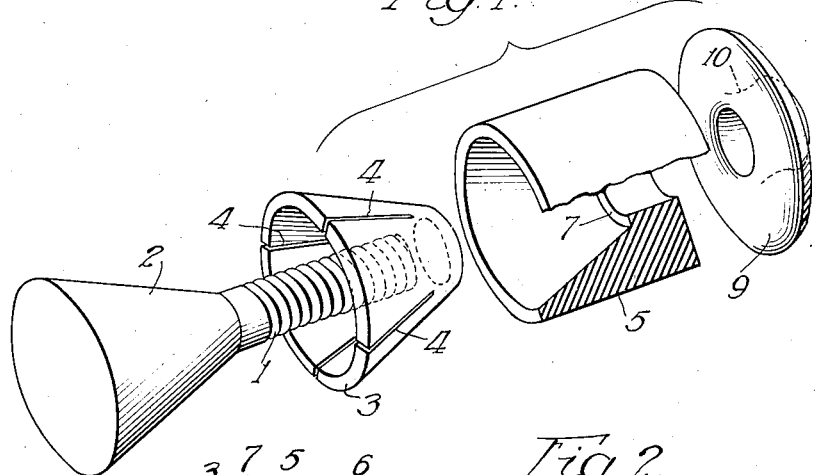
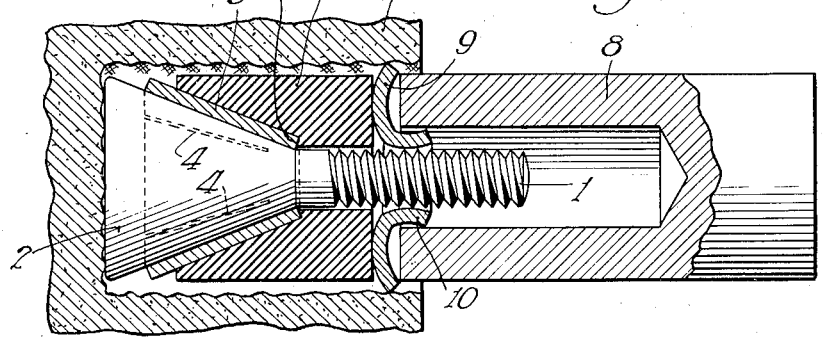
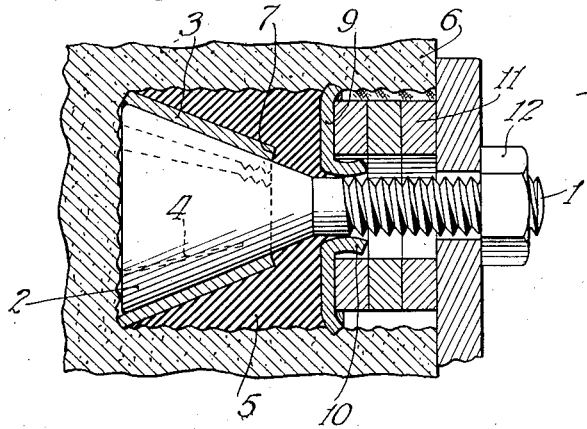
Inventor
Ralph S. Peirce
By A. Trevor Jones Atty.

Patented June 4, 1940

2,203,178

UNITED STATES PATENT OFFICE 2,203,178

ANCHORING DEVICE

Ralph S. Peirce, Hinsdale, Ill.

Original application February 20, 1930, Serial No. 429,978. Divided and this application July 27, 1936, Serial No. 92,807. Renewed October 27, 1939

16 Claims. (Cl. 72—105)

My invention relates to anchoring devices which are generally inclusive of a bolt provided with an enlargement thereon and having expansible members surrounding the bolt shank.

The invention is of particular utility in providing an anchoring device or expansion insert for attachment of objects to masonry, tile or the like, and, among other objects, the invention provides an improved device for this purpose.

An object of the invention is to provide a collar advantageously in the form of a dished washer adjacent the outer end of the device which serves to receive the impacting tool and by its improved formation desirably prevents exudation of the soft metal part outwardly of the device when the device is being impacted, and, also, prior thereto, by engagement with the bolt or other holding member, assists in holding the parts together against casual separation so that they may be shipped without other securing means, the parts remaining together as intended and eliminating the necessity of placing a nut on the bolt, in the case of a threaded bolt, to hold the parts together. The custom of placing a nut on the bolt to hold the parts together as has been hereto, is time-consuming both in placing the nut thereon for shipment, then removing it before the device is expanded and finally replacing the nut after the device is expanded. In accordance with my invention the nuts may be packed separately, thus necessitating their being screwed on the shank of the bolt but once.

Another object of the invention is the provision of a filler between the dished washer and an object to be anchored, for example, such filler being desirably of deformable or frangible character and being also advantageously of sectional formation so that it may be built up as desired.

The washer and filler either together or singly constitute what I have referred to as an impacting collar.

Other objects and advantages will be apparent from the following description taken together with the accompanying drawing in which—

Figure 1 is a perspective exploded view of an anchoring device constructed in accordance with my invention, parts being broken away for clearness of description;

Figure 2 is a view illustrating a portion of a wall or other support in section and an anchoring device of my invention partially in section and partly in elevation, an impacting tool also being illustrated, partially in section and partly in elevation, this figure illustrating the anchoring device before the impacting tool has acted thereon; and Figure 3 is a view generally similar to Fig. 2 but showing the parts of the anchoring device after the impacting tool has acted thereupon and illustrating a filler which, also in accordance with my invention, may be interposed between the setting collar and the nut that is screwed upon the bolt.

Referring in detail to the illustrative embodiment shown in the drawing, the holding member 1 is shown in the form of a bolt having a threaded shank at its outer end and an expanding member thereon in the form of an enlargement 2, which may constitute a bolt head. This enlargement is shown as being bigger, in proportion to the shank, than may actually be true in practice, but it is thus illustrated for the sake of clearness. The said enlargement, as shown, tapers from its end of the bolt toward the other bolt end, that is its diameter is reduced from the inner end of the bolt toward the outer end.

What I have termed a metal shell 3 is then placed on the bolt, said shell, in this instance, tapering similarly to the enlargement 2 upon its inner and outer broad surfaces and thus being adapted to snugly receive the bolt enlargement. This shell is itself expansible and is desirably formed with slits to assist in its expansion, such for example as the slits 4 extending longitudinally for a portion of the length of the shell. The shell, however, initially is unexpanded and terminates short of the largest diameter of the enlargement 2. In this instance the shell 3 initially encircles the enlargement substantially continuously (i. e., the slits 4 then being unopened) at a point relatively near the greatest diameter of the cone-shaped enlargement 2.

The other expansible member or soft metal part or sleeve 5 is formed of metal, such as lead, relatively softer than the metal of the shell 3. As here shown, said sleeve 5 has a generally cylindrical exterior surface and a bore having one portion, its outer portion, also generally cylindrical, and contiguous with the bolt shank, and another bore portion which tapers similarly to the taper of the shell and bolt enlargement. The sleeve 5 initially desirably terminates short of the larger or inner end of the shell and extends outwardly beyond the smaller or outer end of the shell, which thus abuts the interior annular shoulder 7 of the sleeve.

To complete the assembly of my device, I desirably include a setting or impacting collar 9 in the form of a washer placed on the bolt after the shell and sleeve are placed thereon. The setting or impacting collar 9 is of metal harder than the metal of the sleeve 5, for example being of soft steel, so as to be deformable under the force of the impacting tool 8. The setting or impacting collar 9 desirably has a broad face of greater diameter than the impacting tool and also a greater diameter than the sleeve 5, the hole of the setting or impacting collar which receives the bolt being also of small enough diameter to advantageously have marked frictional engagement with the bolt shank. As here shown also the setting collar is desirably of dished formation to provide an annular pocket for receiving the annular end of the impacting tool 8, to position the tool with respect to the bolt shank and protect the threads upon the bolt. The threads may be further protected and the frictional engagement of the setting collar with the bolt may be further enhanced by providing a guarding continuation 10 on the setting collar, this guard continuation surrounding the bolt and extending away from the sleeve 5. The collar or dished washer 9 also tends to flatten out into contact with the hole, preventing exuding of the soft metal 5 outwardly.

It will be understood that to set or expand the device as shown in Fig. 3, the impacting tool 8 is forced against the collar or dished washer 9 which in turn forces the sleeve 5 against the shell 3 and at the same time expands the soft metal of the sleeve 5 laterally. Also, since the shell 3 is also deformable, this shell is also expanded laterally, and in this instance is expanded over the tapered head 2 of the bolt. As constructed and arranged, the shell 3 by expanding, ensures the lateral expansion of the sleeve 5 toward the lateral walls of the hole in the masonry 6 and prevents exudation of the soft metal part or sleeve 5 around the inner end of the bolt head 2. The shell 3 therefore provides an expanding member which automatically adjusts itself to variations which may occur in practice in relative sizes of holes and bolts therefor. The interengaging means as at 7 between the sleeve and shell assists in this by retarding slippage between the shell 3 and the sleeve 5.

I may provide a filler 11, which may be of annular sectional formation, this filler being adapted to be interposed between the nut 12 that is screwed upon the bolt, and the collar or dished washer 9. The filler may also serve as a setting tool that may be actuated by tightening the nut 12, and when so actuated, serving to expand the member 5, by reason of the tendency of the bolt and nut to move in opposite directions, this force exerted upon the filler through the intermediation of an object which the nut 12 clamps to the masonry 6. In this case the washer 9 and filler 11 together constitute an impacting collar. The filler 11 is advantageously made of some material such as asbestos which is not only non-heat conducting but which also being of yieldable or frangible formation, the filler is capable of collapsing when sufficient pressure is placed thereon so that when resistance to further inward movement of the expansible members reaches a given value, the filler will collapse and permit the article to be supported between the wall and the nut 12 to be drawn, by the nut 12, into tight abutment with the wall 6.

The invention is of course not limited to the details of construction shown for purposes of illustration. Furthermore, it is not indispensable that all features of the invention be used conjointly, as sub-combinations of my invention are highly useful.

This application is a division of my co-pending application Serial No. 429,978, filed February 20, 1930, which issued as Patent No. 2,052,793, dated September 1, 1936.

Having described my invention, I claim:

1. In an anchoring device of the expansion insert type, the combination with expanding means and expansible members adapted to be expanded thereon, of an impacting member for exerting pressure on the expansible members including a frangible element of asbestos adapted to collapse upon a predetermined pressure placed thereon.

2. In an anchoring device of the expansion insert type, the combination with expanding means and expansible members adapted to be expanded thereon, of an impacting member for exerting pressure on the expansible members including an element formed of sections of asbestos adapted to collapse upon a predetermined pressure thereon.

3. The combination with a bolt having a shank and an enlargement thereon, of an outwardly dished washer on the bolt shank, said washer having a radially extending portion adapted to receive the blows of an impacting tool, and an integral angularly related portion in the form of a guarding sleeve snugly engaging the bolt shank, and extending toward the end of said bolt that is to be toward said impacting tool, and an expansible sleeve-like member of relatively soft metal between the washer and the enlargement.

4. The combination with a bolt having an enlargement thereon and having its shank threaded; of an expansible member surrounding and contiguous with the bolt shank; a nut screwed upon the bolt shank to hold an object that is to be supported; and a frangible filler interposed between the nut and expansible member and operable by the nut to press upon and expand the expansible member, whereby the bolt tends to move in the opposite direction from the filler in frictional engagement with the expansible member.

5. The structure of claim 4 wherein the expansible member is of soft metal and the filler is made of heat insulating material.

6. The structure of claim 4 wherein the filler is of sectional formation whereby it may be built up as desired.

7. In an anchoring device, the combination with a bolt; of an expanding member upon said bolt at its inner end; an expansible member surrounding said bolt and formed of metal relatively softer than the bolt; an outwardly dished washer surrounding said bolt shank and formed of deformable metal but harder than the metal of the expansible member and having a broad face engaging the end of the expansible member that is remote from the expanding member and provided to receive the blows of an annular impacting tool which is prevented by the washer from becoming imbedded in the expansible member, said washer being also of a diameter to be expanded laterally beyond the expansible member to be forcibly engaged with the wall of a hole that receives the bolt when said washer is hit by the impacting tool to prevent outward exudence of the soft metal of the expansible member; and a guarding continuation extending centrally outwardly of the washer.

8. In an anchoring device, the combination with a bolt; of an expanding member upon said bolt at its inner end; an expansible member surrounding said bolt and formed of metal relatively softer than the bolt; a washer surrounding said bolt shank and formed of metal harder than the metal of the expansible member and having a broad face engaging the end of the expansible member that is remote from the expanding member and provided to receive the blows of an annular impacting tool which is prevented by the washer from becoming imbedded in the expansible member, said washer being of dish formation to receive the impacting tool; and a frangible filler of annular formation received on said bolt in said washer.

9. In an anchoring device, the combination with a bolt; of an expanding member upon said bolt at its inner end; an expansible member surrounding said body and formed of metal relatively softer than the bolt; and a washer surrounding said bolt shank and formed of metal harder than the metal of the expansible member and having a broad face engaging the end of the expansible member that is remote from the expanding member and provided to receive the blows of an annular impacting tool which is prevented by the washer from becoming imbedded in the expansible member, said bolt shank being threaded and the washer being provided with a guarding continuation in the form of a sleeve surrounding the bolt and extending away from the expansible member and snugly engaging the threaded shank of the bolt.

10. An anchoring device including the combination of an expanding member; a cylindrical soft metal expansible member at least partially surrounding the expanding member; and an impacting collar of deformable but harder material than the expansible member abutting the soft metal member and movable with respect to the expanding member, said collar having a central angularly extended continuation adapted to engage the expanding member and the expanding member having a threaded portion thereof extended through the soft metal member to frictionally engage said continuation to guard against accidental separation of the parts.

11. In an anchoring device of the class described, the combination including an expansible elongated soft metal sleeve, an abutment member at each end thereof, said abutment members being relatively movable longitudinally of the sleeve and of each other and being of deformable but relatively harder material than the sleeve, the outwardly facing member being in the form of a dished washer and means carried by the device having engagement with the abutment members to hold the parts together against accidental separation, but permitting ready relative movement of the parts when so intended.

12. In an anchoring device, the combination of an expansible soft metal cylindrical member, filler means of suddenly yieldable material at one end thereof, an expansion member of relatively harder material at each end of the soft metal member, one of said expansion members being between the soft metal member and the filler means, said soft metal member being adapted to be expanded by pressure through the medium of the filler means and one of the expansion members with the other expansion member as an abutment and whereby upon predetermined expansion of the soft metal member the filler means will collapse to reduce the space occupied thereby.

13. In an anchoring device, the combination with an expanding member and an expansible soft metal member to be expanded thereon, of a dished washer at one end thereof of the expansible member remote from the expanding member, and an annular filler formed of longitudinally separable sections received in the dished face of the washer whereby said washer prevents contact of the soft metal and filler while guiding both under impact.

14. In an anchoring device of the class described, the combination with an expansible soft metal member adapted to be placed about a holding bolt or the like, of a frangible element in abutment with said soft metal member and adapted to withstand a substantially predetermined pressure thereagainst whereby to impact said soft metal member about the bolt and upon a substantially predetermined resistance to further impacting of said soft metal member, to collapse suddenly to reduce the space longitudinally of the bolt occupied by the frangible element.

15. In an anchoring device of the expansion insert type, the combination with expanding means and an expansible member adapted to be expanded thereon, said expansible member being a relatively soft lead sleeve, of an impacting member for exerting pressure on the expansible member comprising a dished washer in abutment with said sleeve at its outer end and adapted to flatten out upon pressure placed thereon to prevent outward exudence of the lead.

16. In an anchoring device, the combination of an expansion member, an expansible soft metal cylindrical member adapted to be expanded thereon, an impacting member for exerting pressure on the expansible member including filler means of suddenly yieldable material at one end thereof, said soft metal member being adapted to be expanded by pressure through the medium of the impacting member with the expansion member as an abutment and whereby upon predetermined resistance to expansion of the soft metal member, the filler means will collapse to reduce the space occupied by the impacting member.

RALPH S. PEIRCE.